United States Patent [19]
Dailey

[11] Patent Number: 5,398,874
[45] Date of Patent: Mar. 21, 1995

[54] CROP SPRAYER HAVING CROP ROW AND BETWEEN CROP ROW CHEMICAL APPLICATION

[76] Inventor: Darrell R. Dailey, Rte. 2, Box 2015, Morven, Ga. 31638

[21] Appl. No.: 136,828

[22] Filed: Oct. 18, 1993

[51] Int. Cl.⁶ .................... B05B 15/04; A01C 23/00
[52] U.S. Cl. .................................... 239/288; 239/175
[58] Field of Search ................... 239/288–288.5, 239/159, 164, 104, 172, 175

[56] References Cited

U.S. PATENT DOCUMENTS

| | | |
|---|---|---|
| 1,669,435 | 5/1928 | Wheeler . |
| 1,982,086 | 11/1934 | Trueman . |
| 2,663,973 | 12/1953 | White ............................ 239/288 |
| 3,038,665 | 6/1962 | Doerr . |
| 3,294,324 | 12/1966 | Skaptason .................... 239/288 |
| 3,445,961 | 5/1969 | Elsworth ...................... 239/288 |
| 4,213,505 | 7/1980 | Jolley . |
| 4,353,505 | 10/1982 | Kinder ......................... 239/288 |
| 4,439,948 | 4/1984 | Brown et al. . |
| 4,449,667 | 5/1984 | Tyler . |
| 4,521,988 | 6/1985 | Thacker . |
| 4,641,781 | 2/1987 | McCrea et al. . |
| 4,646,971 | 3/1987 | Rogers . |
| 4,873,788 | 10/1989 | Viramontes ................... 239/288.5 |
| 4,880,160 | 11/1989 | Patterson et al. . |
| 4,893,755 | 1/1990 | Keathley ...................... 239/288 |
| 4,947,581 | 8/1990 | Claussen et al. . |
| 5,155,933 | 10/1992 | Claussen et al. . |
| 5,156,338 | 10/1992 | Borland et al. . |
| 5,248,090 | 9/1993 | Williamson ................... 239/288 |

FOREIGN PATENT DOCUMENTS 1566395  5/1969  France .................... 239/288

Primary Examiner—Karen B. Merritt
Attorney, Agent, or Firm—Dowell & Dowell

[57] ABSTRACT

An agriculture sprayer for applying herbicides between crop rows while simultaneously applying root growth stimulants, fungicides, fertilizers and/or insecticides to plant rows. The sprayer includes a tool bar to which a plurality of adjustable primary spray hood assemblies are pivotally mounted so as to be vertically movable as well as adjustable in pitch angle from front to rear so that the assemblies will follow the terrain of a field being sprayed. The primary spray hood assemblies include detachable nozzles for supplying chemicals to weeds confined within the hoods of the assemblies. Auxiliary spray nozzles are mounted exteriorly of the hoods for spraying chemicals toward the base of adjacent crop rows. In some embodiments secondary hood assemblies for covering plant rows are provided intermediate the primary spray hood assemblies and are used for spraying chemicals to the foliage of the plants in the crop rows.

20 Claims, 5 Drawing Sheets

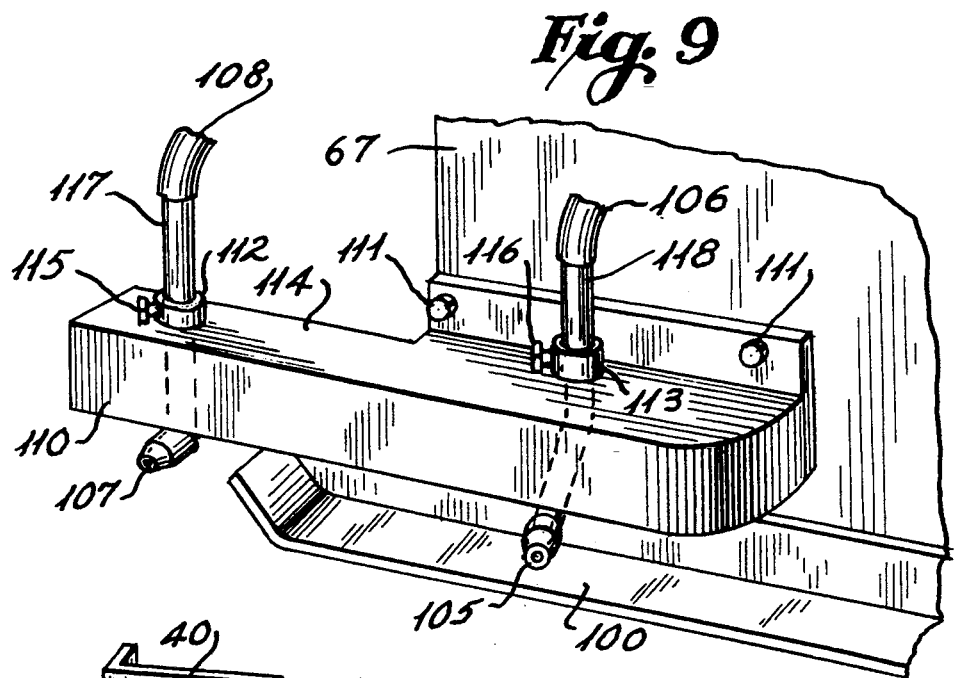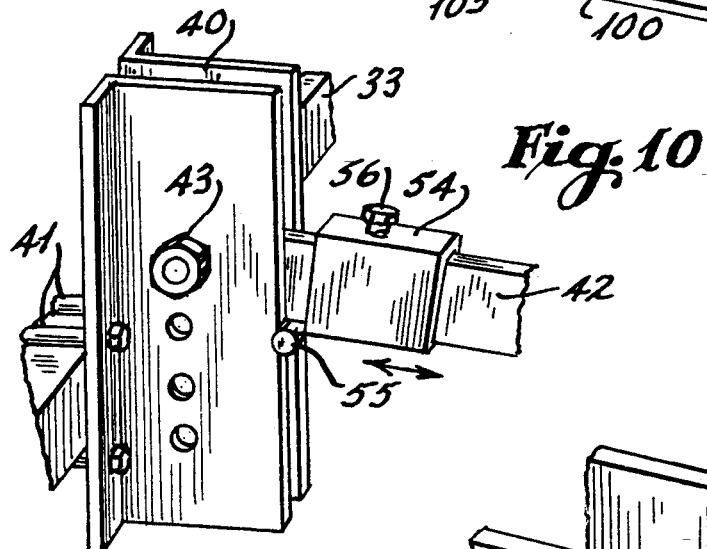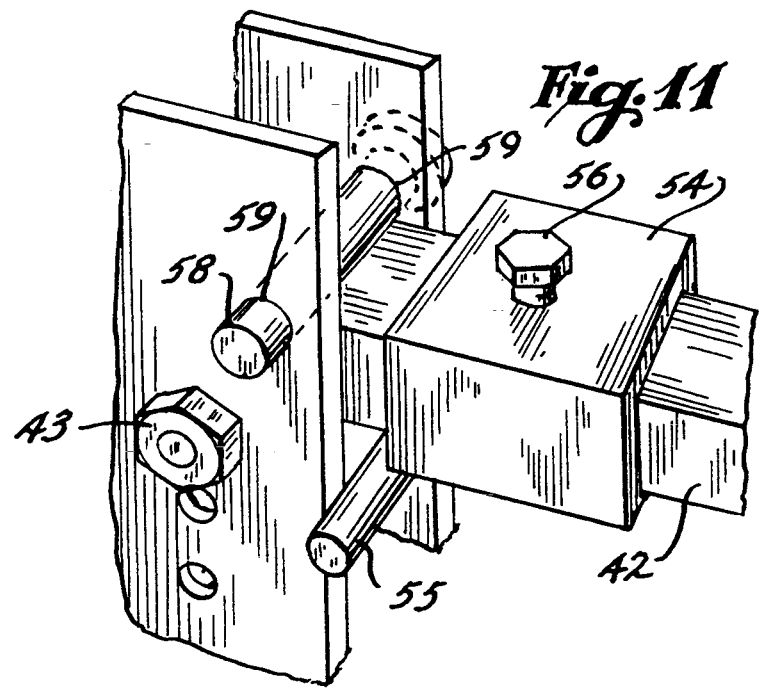

CROP SPRAYER HAVING CROP ROW AND BETWEEN CROP ROW CHEMICAL APPLICATION

BACKGROUND OF THE INVENTION

1. Field of the Invention

This invention is generally directed to agriculture crop sprayers and particularly to such sprayers that are designed to be mounted to the three-point hitch of a farm tractor. The sprayers are of the type utilized for no till crop spraying and include a plurality of spray nozzles which are mounted within protective hoods or housings which are designed to enclose the spray nozzles to prevent the dissipation of chemicals being directed to kill weeds intermediate plant crop rows. These primary spray hood assemblies are mounted to support beams in such a manner that each assembly is vertically pivotable with respect to an implement tool bar to thereby allow the assemblies to traverse uneven terrain. Each primary spray hood assembly is also suspended from a support beam in such a manner that the pitch angle, from front to rear, of the assembly may be regulated.

The sprayer of the present invention further includes a plurality of secondary spray hood assemblies which are mounted intermediate the primary spray hood assemblies and which are vertically adjustable relative to a crop row. The secondary spray hood assemblies are utilized for confining insecticides, fungicides or other chemicals which are sprayed on the foliage of plants in a crop row.

The invention further includes additional sprayers which are mounted to the exterior sidewalls of the primary spray hood assemblies and which may include one or more nozzles for directing herbicides, fertilizers or growth stimulants adjacent to or onto the base of adjacent plants in a crop row.

The invention permits the simultaneous spraying of chemical herbicides, fungicides, insecticides, root growth stimulants and fertilizers without the chemicals being wind driven from one area to another so that the plants are not damaged and so that the chemicals are contained and not dissipated into the atmosphere.

2. History of the Related Art

Control of weeds in agriculture fields requires either mechanical cultivation to uproot and turn the weeds between adjacent crop rows or the application of chemical herbicides to destroy the weeds intermediate the crop rows. Large agriculture sprayers of the type designed to be mounted to conventional tractors are generally referred to as no till sprayers. An early example of an agriculture sprayer of a no till type is disclosed in U.S. Pat. No. 2,580,145 to White. The sprayer disclosed in White includes a frame mounted to a tractor body from which a plurality of shoes or runners are pivotably supported. Spray nozzles are mounted to the runners and are oriented so as to direct a chemical spray towards weeds intermediate rows of agriculture crops. Unfortunately, such a spray device is not practical for use in actual field conditions wherein the chemical herbicides being sprayed to control weeds can often be driven by normal winds toward the base of the plants thereby causing severe damage to the crops which are planted closely adjacent the areas in which the herbicide is being sprayed. Further, the free release of toxic chemicals into the air, even though being directed toward a specific area, allows a significant portion of the toxic chemicals to be entrained in the air causing a potential health hazard not only to the farmer but to other individuals within the vicinity of the field being sprayed.

It has now been recognized that some control has to be provided to protect the plants in a crop row from being damaged by herbicides being sprayed between the crop rows. In U.S. Pat. No. 3,038,665 to Doerr, a no till sprayer for connection to the three-point hitch of a tractor is disclosed which includes a plurality of generally u-shaped elongated hoods which are mounted to a tool bar assembly. With this device, the sprayers are mounted intermediate the hoods for depositing herbicides in the area between crop rows. The hoods have vertically adjustable side baffles which could be raised or lower into fixed positions depending upon the height of the crop stand. With this type of spraying apparatus, it is possible to protect young plants from the effects of herbicides being sprayed between crop rows to some degree by enabling plants adjacent to the spray nozzles to be directly screened from the spray nozzles. However, the spray from the nozzles is easily driven by surface winds to the base and foliage of agriculture crops either forwardly or behind the protective hoods. Further, the sprayer does not provide any means for allowing the spray nozzle to effectively follow uneven surface terrains and, therefore, in some instances, spray can pass under the edges of the hoods, Also, in some instances, the hoods can actually be driven into the ground thereby causing damage to the sprayer. The sprayer of Doerr also does not provide any structure for effectively preventing the entrainment of toxic chemicals into the air.

A somewhat similar type of field sprayer is disclosed in U.S. Pat. No. 3,294,324 to Skaptason. The sprayer in this patent includes a plurality of hoods for protecting plants in a crop row from adjacent herbicidal sprayers mounted to deposit herbicide in the area between the crop rows. However, as with other prior art devices, a significant portion of the herbicidal spray between the crop rows is not enclosed and therefore is easily entrained into the air and accidentally directed against adjacent crop plants.

Other types of chemical no till crop sprayers have been designed to provide baffles or screens as opposed to housings for protecting crop rows when spraying herbicides to the area between adjacent crop rows. Some of these devices were designed to theoretically permit the simultaneous application of herbicides to the areas between the crop rows and insecticides or fertilizers to the area of the crop rows. In U.S. Pat. No. 4,439,948 an agriculture no till sprayer is disclosed in which sprayers are mounted to gauge wheels connected to a tool bar by a parallel linkage assembly. The sprayers are designed to be located either intermediate the exterior surface of adjacent baffle assemblies or intermediate a pair of baffles mounted to a common assembly. In this manner, the herbicides may be deposited between the inner surfaces of the baffle assemblies while the plant rows can be acted upon by spray nozzles mounted above the plant rows and exteriorly of adjacent assemblies. However, as with prior art spraying devices, the baffle system does not adequately confine the chemical herbicides which are being sprayed and it is easily possible for herbicide to be directed either directly to the base of adjacent crop or to be entrained within the air in sufficient quantity to damage adjacent crops. Further, with this type of sprayer both the herbicidal sprays as well as insecticidal, fungicidal or various chemical fertilizers are entrained in the air as the sprayer passes through the field and causing significant health risk to individuals and wildlife. Some additional examples of sprayers which utilize a baffle type closure system are disclosed in the U.S. Pat. Nos. 4,873,788 to Varamontes and 4,521,988 to Thacker.

A variation of the hood type enclosures for protecting crops are disclosed in U.S. Pat. Nos. 4,947,585 and 5,155,933 to Claussen et al. The spray shield assemblies disclosed in these patents are designed to provided enlarged u-shaped hoods of a size to extend between adjacent crop rows as opposed to being of a size to be mounted over a crop row. The hoods enclose a plurality of spray nozzles which are used to direct herbicide between the crop rows. The spray hoods are designed to be suspended from a fixed beam extending from a frame carried by the three-point hitch of a tractor. Although such hoods more adequately confine toxic herbicidal chemicals being sprayed in the areas between crop rows, the devices do not provide for the simultaneous spraying of crop rows with other types of chemical sprays including fungicides, insecticides and fertilizers. Further, the devices are not designed to allow tracking of the surface terrain and, therefore, in many instances, it is possible that herbicidal spray may pass under the bottom edge of the hoods thereby adversely effecting adjacent crop rows.

A final type of no till sprayer is disclosed in U.S. Pat. No. 4,353,505 to Kinder. The sprayer disclosed in this patent provides an enlarged housing in which the spraying equipment is disposed. In this manner, substantially any chemical being deposited is retained within the housing. Unfortunately, with this type of device it is necessary to provide a solid pivotable wall or flap along the entire length of the device in order to entrap the chemical being sprayed within the housing. Further, there is no breakdown in the housing which allows the effective application of different types of chemicals such as herbicides and fertilizers to be sprayed simultaneously to areas between the crop rows and to adjacent crop rows. Other examples of enlarged enclosed spraying devices are disclosed in U.S. Pat. Nos. 4,641,781 to McCrea et al., 4,646,971 to Rogers and 5,156,338 to Borlan et al.

Some additional examples of prior art devices are disclosed in U.S. Pat. Nos. 1,669,435 to Wheeler, 1,982,086 to Trueman, 4,213,505 to Jolley and 4,449,667 to Tyler.

SUMMARY OF THE INVENTION

A no till spraying apparatus which includes a central tool bar frame and a pair of vertically pivotable outrigger frames which are hydraulically connected to the main tool bar frame and wherein a plurality of primary spray hood assemblies are mounted on pivotable beams connected to the tool bar. The pivotable beams are provided with vertically adjustable gauge wheels which allow the beams to effectively track the land terrain as the sprayer is pulled through the field by a conventional tractor. Each primary spray hood assembly is adjustably suspended from each support beam so that the pitch angle of each hood may be varied from front to rear preferably allowing the front of each hood to be elevated slightly with respect to the rear thereof.

Each of the primary spray hood assemblies of the present invention includes a generally inverted u-shaped hood with the sidewalls being selectively spaced with respect to one another by interior adjusting bars whereby the hoods may be enlarged or decreased in size depending upon the spacing of the crop rows to be sprayed. A plurality of nozzles are removably mounted within each of the hoods so that the nozzles may be readily removed for servicing or replacement as is necessary. The open ends of each of the hoods are preferably closed by flexible flaps which are utilized to enclose the interior portions thereof to limit chemical dissipation into the air surrounding the hoods when the sprayer is utilized in the field.

In order to apply spray closely adjacent to the base of adjacent crop rows, or directly onto the base of plants in adjacent crop rows, one or more spray nozzles are mounted to the outer side edges of each of the primary spray hood assemblies. In some embodiments of the present invention, secondary spray hood assemblies are vertically adjustably mounted intermediate the primary spray hood assemblies for covering adjacent crop rows. The secondary spray hood assemblies are utilized on younger crops when applying insecticides, fungicides or fertilizers to the foliage of the plants with the secondary spray hood assemblies including interiorly mounted spray nozzles. The secondary hood are generally inverted u-shaped and are designed to be seated against the side edges of the adjacent primary hoods to prevent the entrainment of chemicals being sprayed into the atmosphere.

It is the primary object of the present invention to provide an agriculture no till sprayer of the type which provides primary spray hood assemblies for enclosing the spray nozzles utilized to deposit herbicides between adjacent crop rows of a field being treated where the assemblies are designed to minimize the spread of toxic chemicals to adjacent plants and into the atmosphere to thereby decrease possible damage to crops and harmful air toxicity levels in the vicinity of the field being sprayed.

It is also an object of the present invention to provide a no till sprayer which can be utilized to apply up to four or more chemicals, simultaneously, to a field thereby enabling treatment of crops and weeds in a highly efficient manner and reducing costs and time for field spraying.

It is yet a further object of the present invention to provide a no till agriculture sprayer having secondary spray hood assemblies which cooperate with the primary spray hood assemblies to reduce the entrainment of chemicals being applied to the plants in crop rows and wherein the secondary spray hood assemblies may be vertically adjustable depending upon the height of the crops.

It is also an object of the present invention to provide a no till sprayer wherein each of the primary nozzle enclosing hoods are mounted to an implement tool bar in such a manner that the hoods effectively track unlevel terrain thereby ensuring that chemicals are not released under the hoods and ensuring that the hoods do not become damaged by digging or gouging into the ground as the sprayer is pulled through a field.

It is another object of the invention to provide a no till sprayer wherein the spray nozzles associated within the entire implement may be easily removed for servicing and/or replacement.

BRIEF DESCRIPTION OF THE DRAWINGS

FIG. 9 is an enlarged perspective view of the side mounted sprayers utilized with the primary spray hood assemblies of the present invention.

FIG. 10 is an enlarged cross sectional view taken along line 10—10 of FIG. 2 showing the pivot and pivot stop arrangement associated with each of the support beams for the primary spray hood assemblies and showing the vertically adjustable mounts to the secondary spray hoods.

FIG. 11 is an enlarged cross sectional view taken along line 11—11 of FIG. 2 showing the pivot joint between a support beam for one of the primary spray hoods of the present invention with a supplemental locking insert for rotating the beam in non-pivotable relationship when the implement is not in use.

DESCRIPTION OF THE PREFERRED EMBODIMENTS

Figure 1:
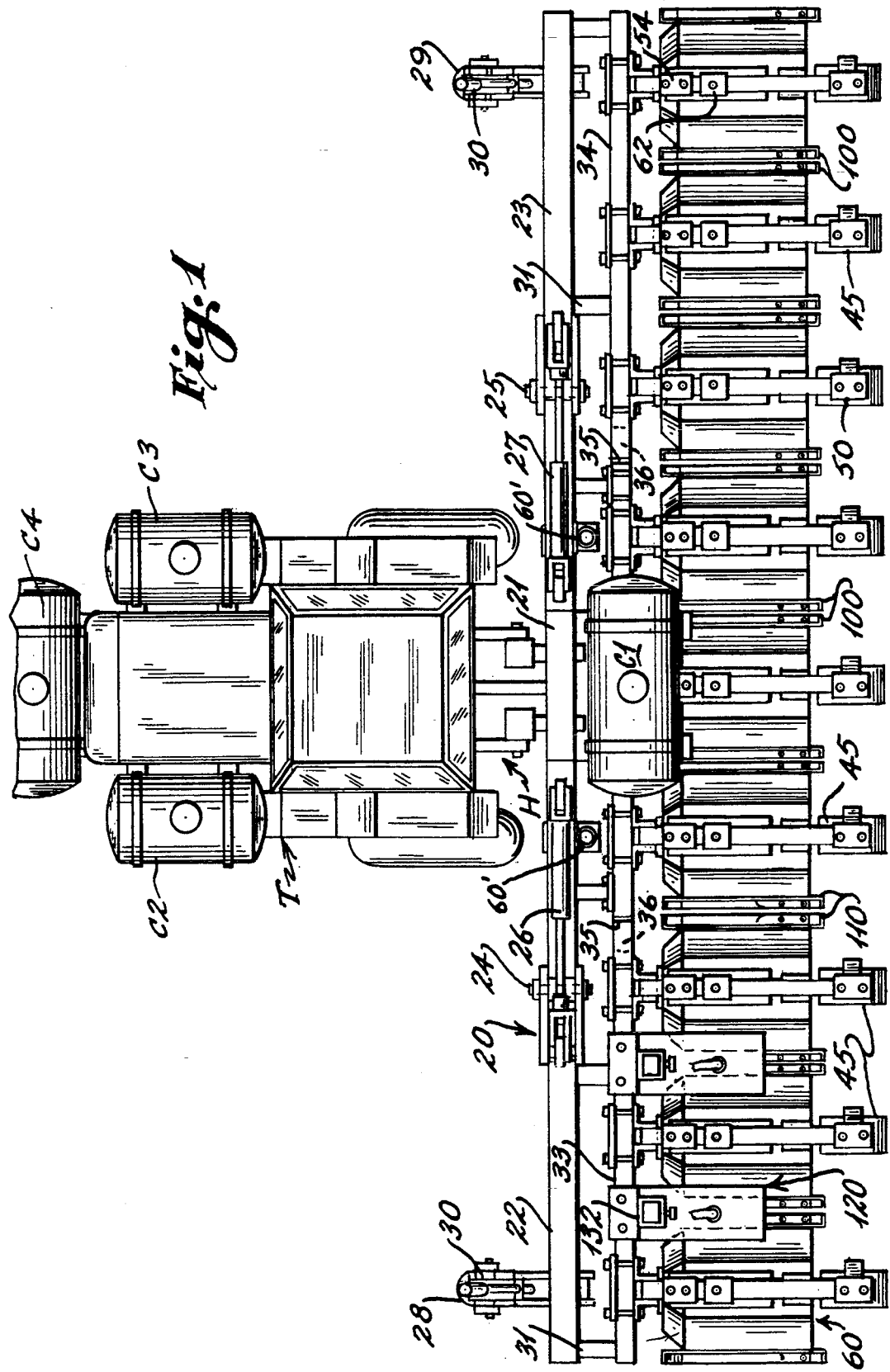
FIG. 1 is a top plan view of the sprayer of the present invention attached to a three-point hitch of a tractor and showing up to four chemical tanks being mounted either to the implement or to the tractor.

With continued reference to the drawings, the several embodiments of the present invention will be shown with reference to the drawing figures.

As shown in FIG. 1, the sprayer 20 includes a primary tool bar frame having a fixed intermediate section 21 and outrigger sections 22 and 23 which are pivotable about joints 24 and 25 with respect to the fixed center section 21. A pair of hydraulic cylinders 26 and 27 are provided for raising and lowering the outrigger sections 22 and 23 with respect to the fixed intermediate section 21. The main tool bar frame is mounted to a conventional three-point hitch "H" of a tractor "T". The outer end portions of the out rigger sections 22 and 23 are adjustably supported by gauge wheels 28 and 29 which are elevated selectively by crank assemblies 30.

One of the benefits of the sprayer of the present invention, when compared with prior art devices, is that the sprayer may be utilized to simultaneously spray a plurality of different types of chemicals including herbicides, fungicides, fertilizers, insecticides and the like. In view of this utility, a primary chemical holding tank "C1" is mounted to the sprayer while supplemental chemical tanks "C2", "C3" and "C4" are mounted to the tractor "T". Although not shown in the drawings, appropriate conduits are provided from each of the chemical tanks to the various spray nozzles which will be disclosed hereinafter. The chemicals are conveyed by a pump assembly (not shown) which may be driven either by the power take-off of the tractor or by some other motive source.

Figure 2:
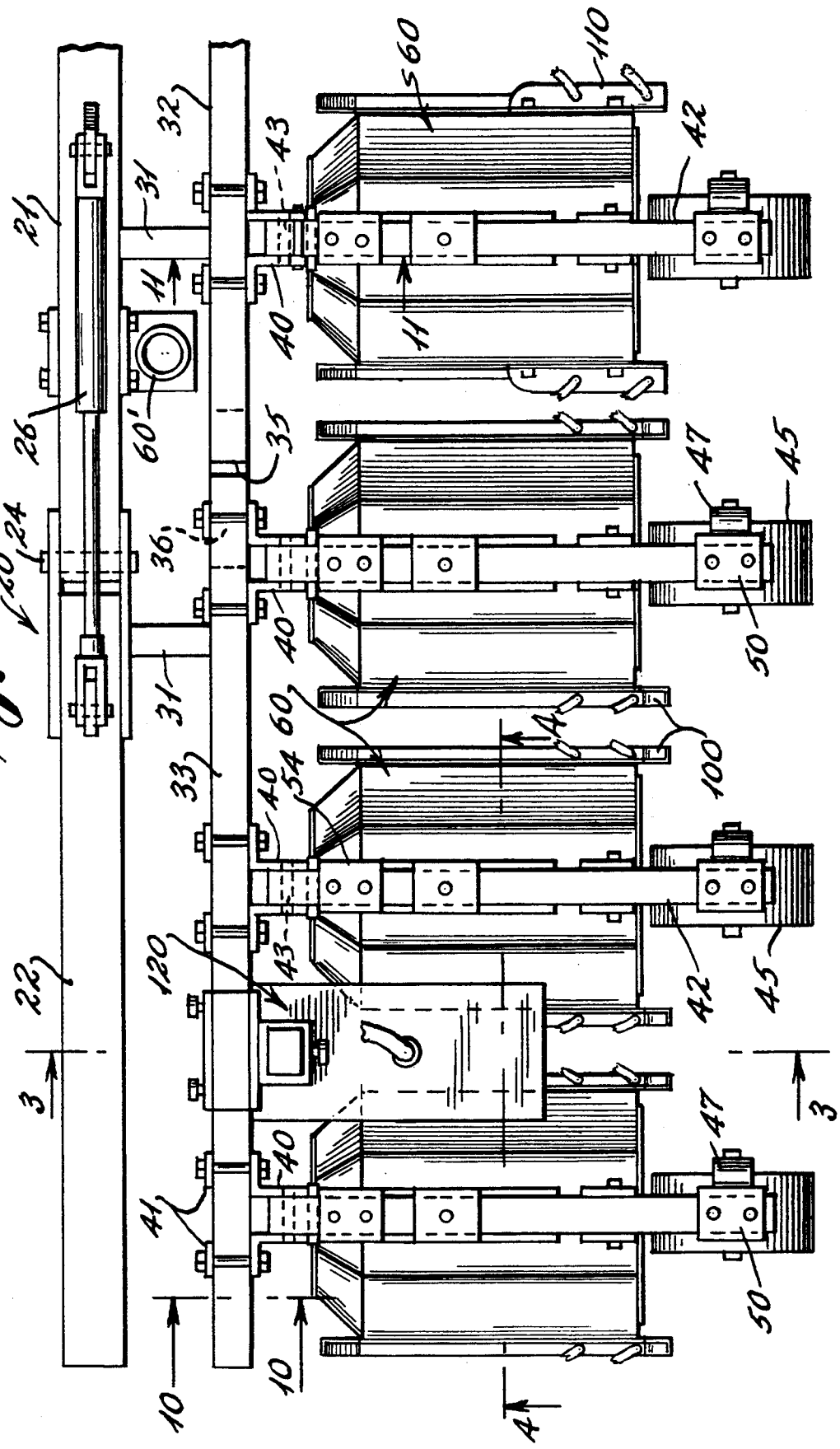
FIG. 2 is a partial enlarged top plan view of several of the primary spray hood assemblies and one of the secondary spray hood assemblies of the present invention shown in the area adjacent a pivotable joint of the implement tool bar between a fixed bar section connected to the three-point hitch of the tractor and one of the outrigger tool bar sections.

With specific reference to FIGS. 1 and 2, the implement tool bar frame of the present invention further includes a secondary tool bar having an intermediate section 32 and outrigger sections 33 and 34. The supplemental tool bar frame is connected to the primary tool bar frame by a plurality of spaced struts 31. The outrigger sections 33 and 34 of the supplemental tool bar frame are pivotable about open joints 35 so as to be moveable upperwardly relative to the inner portion thereof so that the outrigger sections may be raised. When the outriggers are lowered they are limited in their downwardly descent by fixed plates 36 which are welded to extend either from the intermediate secondary tool bar section 32 or the outrigger sections 33 and 34 as is shown in 35 in the drawings.

Mounted to the sections of the auxiliary tool bar frame are a plurality of implement support brackets 40 which are shown as being generally equally spaced along the length of the auxiliary tool bar. The mounting brackets 40 are secured utilizing bolt assemblies 41. A plurality of implement support beams 42 are pivotably mounted within the support brackets 41 by pivot pins 43, as is shown in FIGS. 10 and 11. The pivot pins are disposed through aligned openings in opposing flanges of the brackets 40. As shown, the implement support beams 42 extend generally perpendicularly with respect to the tool bar support frame. The beams are designed to permit an implement secured thereto to accurately track the terrain as the beams are allowed to pivot up and down while being supported by gauge wheels 45, such as shown as FIGS. 1, 2, 3 and 5.

Each gauge wheel is mounted by a vertical strut 46 which is vertically adjustably mounted relative to a support housing 47 and securable thereto by way of bolts 48 which are placed through aligned openings in the strut 46 and housing 47. The housing 47 is adjustably engaged with a support beam 42 by way of a mounting bracket 50 which is secured to the beam 42 by way of spaced bolts 51. Although the gauge wheel assembly consisting of the gauge wheel, strut, housing and bracket is shown in the drawing figures as being mounted adjacent the trailing end of the beam 42, it is possible, with the present invention, to place the gauge wheel assembly at different positions along the length of the beam 42 such as in front of an implement being mounted thereto as opposed to rearwardly, as shown in the drawing figures.

With specific reference to FIG. 10, the vertical pivotable movement of a beam 42 may be selectively regulated by an adjustable slide stop 54 which is designed as a sleeve encircling the inner portion of the beam 42 adjacent the mounting bracket 40. A limit pin 55 is welded or otherwise engaged with the front fate of the mounting bracket beneath the beam 42 at a predetermined location. In this manner, as the beam 42 pivots with respect to the mounting bracket 40, the lower edge thereof will at some point engage the limit pin 55. To further adjust the vertical pivoting relative to the pivot pin 43, the slide stop 54 may be moved along the length of the beam 42 as shown by the arrow in FIG. 10 and thereafter locked into a preselected position by locking screw 56. The slide stop 54 will act to engage the pin 55 at a different position then when engaged by the lower edge of the beam 42.

When the implement is not use and it is desired to retain one or more of the beams in fixed relationship with respect to the support brackets so that the implement may be self-supporting when not being towed by a vehicle, an auxiliary pin 58 is inserted through aligned openings 59 made in the flanges of the mounting bracket 40 just above the upper surface of the beam 42. In this manner, a beam is prevented from pivoting with respect to a pivot pin 43. With respect to FIG. 1, a pair of vertically adjustable stands or supports 60' are attached to the outer portions of the fixed primary tool bar frame section 21 so that, when lowered they will engage the ground. With these members engaging the ground and at least two spaced beams 42 locked into position, four spaced points of contact are created which will effectively support the full length of the implement when not in use.

As previously discussed, the sprayer of the present invention provides for the containment of toxic chemicals which are applied to both areas between crop rows and to the crops in the crop rows. In order to accomplish this, the sprayer includes a plurality of primary implement spray hood assemblies which are adjustably mounted by suspension bracket assemblies 61 which are otherwise secured to mounting brackets 62 adjustably carried along the length of the support beams 42. The brackets 62 are provided with one or more fastening bolts 63 which are used to secure the brackets in a fixed position along the length of the beams 42.

Figure 7:
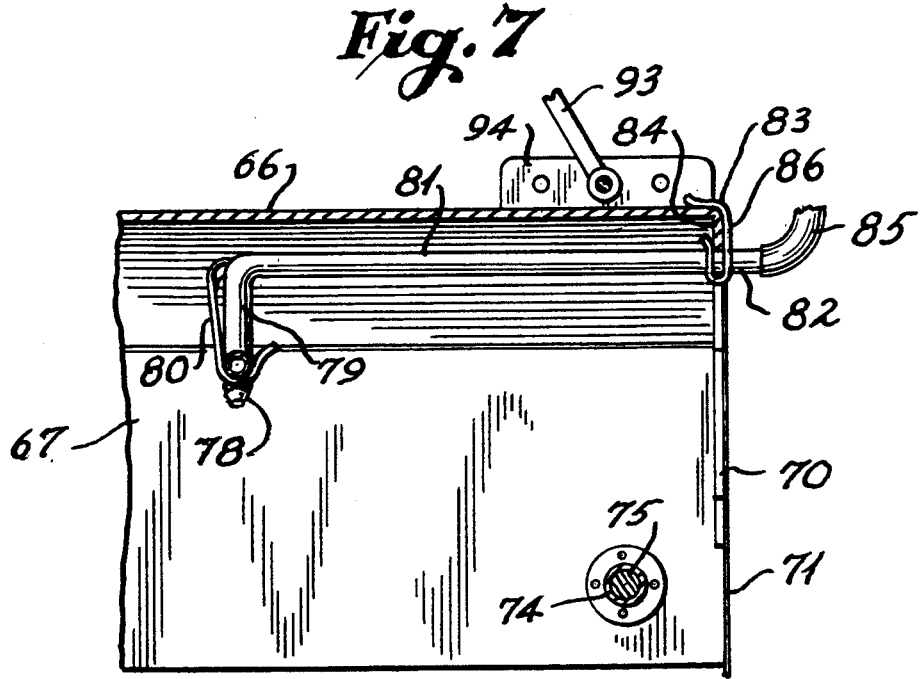
FIG. 7 is an enlarged cross sectional view showing the mounting arrangement for the spray nozzles shown along line 7—7 of FIG. 6.
Figure 8:
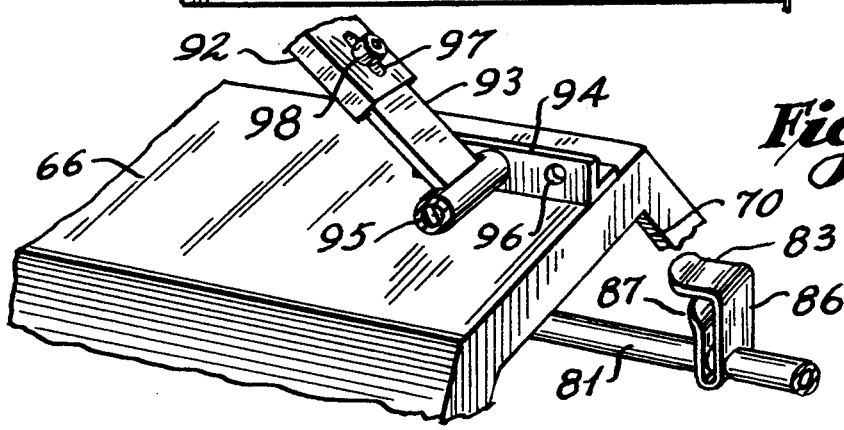
FIG. 8 is an enlarged assembly view of the mounting arrangement for the spray nozzles within a primary hood, taken along line 8—8 of FIG. 5.

Each primary spray hood assembly 60 includes a generally inverted u-shaped hood 65 which is preferably formed of stainless steel but which may also be molded of plastic or formed of a galvanized sheet metal which may or may not have applied thereto a protection coating of "TEFLON ™" or other plastic to reduce any rusting of the hood. Each hood includes an upper wall 66 and spaced sidewalls 67 and 68. An enlarged opening 69 is provided in the front end of the housing and a similar opening 70, as shown in FIGS. 7 and 8, in the rear end thereof. Either one or both of the front and rear openings 69 and 70 may be substantially closed by flexible flaps 71 which are mounted to the hood along the area defining the openings 69 and 70. The flaps may be formed of a plastic, rubber, treated fabric or other type of material. It is the object of the flaps to contain as much chemical spray within the housing as is possible and to further prevent the passage of surface winds through the housing when the implement is in use.

Figure 6:
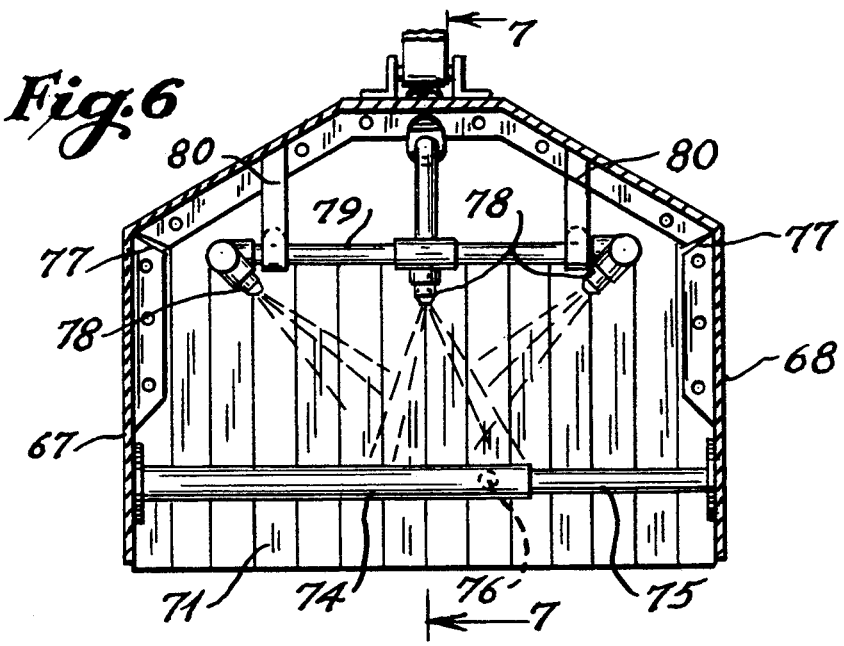
FIG. 6 is a cross sectional view through the hood of FIG. 5.

Agriculture crop rows are not consistently spaced at the same distances. In order to allow the present invention to be utilized in areas between the crop rows of varying spacing, the hood 65 is designed to be expanded or contracted depending upon plant row spacing. In order to do this, mounted interiorly of the housing, as shown in FIG. 6, are one or more spacer bars 74 having telescoping sections 75. The telescoping sections are moved inwardly or outwardly with respect to the other section 74 and are locked in an appropriate position by locking bolt 76. In this manner, the sidewalls 67 and 68 may be either forced outwardly relative to one another or drawn slightly inwardly thereby effectively changing the coverage area for the hood. The reinforcing at the corners of the sidewalls, as shown at 77, may be spaced to allow flexing of the sidewalls.

Mounted interiorly of the hoods 65 are a plurality of spray nozzles 78 which are mounted to a common header 79 supported by a pair of depending u-shaped brackets 80 which are mounted to the upper interior wall of the hoods, as shown in FIGS. 6. The header 79 is connected to an inlet pipe 81 which is supported at its outer end 82 by a clip 83 which is engagable with an edge 84 defining a portion of the opening 70 into the rear of the hood. As shown, the clip engages both the edge 84 and also the upper surface 66 of the hood. The inlet pipe 81 is connected at its outer end 82 to a flexible distribution conduit 85 which extends to one of the chemical tanks "C1–C4" by way of the pump assembly (not shown).

Utilizing the mounting arrangement disclosed in FIGS. 6–8, it can be readily seen that the spray nozzles 78 may be readily removed from within the hood by disconnecting the clip 83 and lifting the header 79 from the support brackets 80 within the hood. Thereafter the entire assembly may be removed from the hood so that the nozzles may be cleaned or replaced, as is necessary. This arrangement allows a very quick release of the spraying components and thus decreasing maintenance time. As shown in FIG. 8, the clip 83 includes a pair of generally parallel spaced leg portions 86 and 87 having aligned openings therein through which the outer portion 82 of the inlet pipe 81 extends. The portions of the clip adjacent the openings in the spaced leg portions 86 and 87 will bind against the end portion 82 of the inlet conduit to rigidly secure the conduit to the hood when mounted as shown in FIG. 7.

Figure 5:
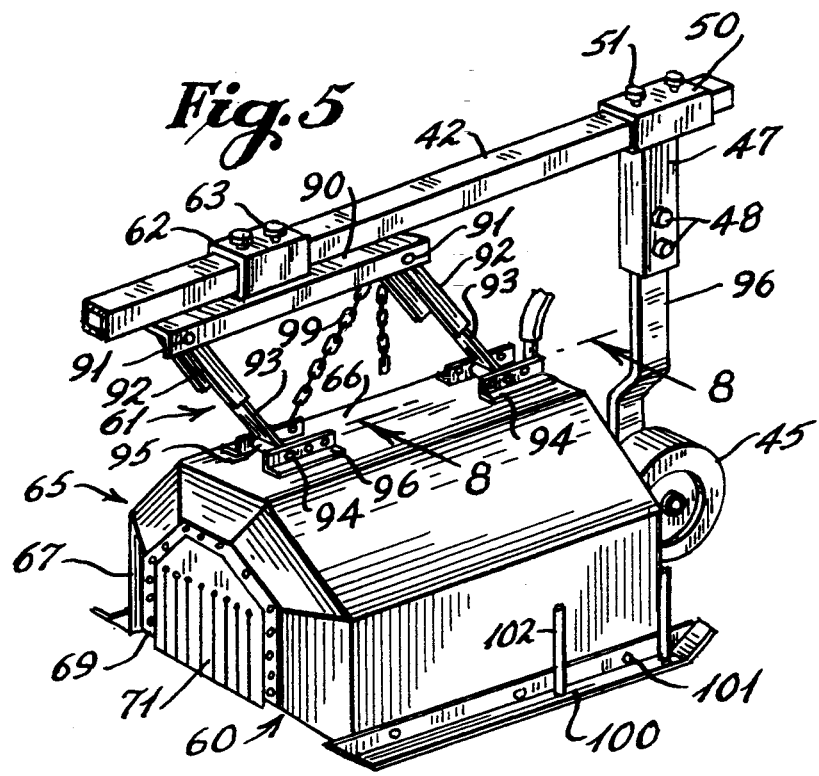
FIG. 5 is an enlarged perspective view of one of the primary spray hood assemblies and its associated pivotable mounting beam and gauge wheel for supporting the assembly to the tool bar frame.

As shown in FIGS. 5 and 8, the suspension bracket 61 allows the primary spray hood assembly 60 to be pivotally supported with respect to the support beam 42 so that the hood 65 will generally float evenly with respect to the ground surface regardless of terrain conditions. The bracket assembly can be further utilized to adjust the pitch angle of the hood relative to the ground by elevating the front end relative to the rear end thereof. The suspension bracket assembly includes a hanger bar 90 having a pair of pins 91 adjacent each end thereof for pivotably supporting u-shaped outer slide brackets 92. The slide brackets are mounted to interior slide mounts 93 having their lower ends pivotally connected to spaced brackets 94 mounted to the upper surface 66 of the hood 65 by way of pivot pins 95. The pivot pins 95 may be selectively located through a plurality of spaced openings 96 provided in the brackets 94. As shown in FIG. 8, at least one or more slots 97 are provided in the outer brackets 92 through which fasteners 98 are disposed. With the fasteners 98 loosened, the slide members 93 may be moved along the slot 97 thereby changing the elevation of either the front or the rear of the hood 65, as desired. Thereafter the fasteners 98 are tightened thereby supporting the hood in adjusted position with respect to the support beam 42.

To control the forward and rearward swinging movement of the hood as it is supported by the suspension bracket 61, a diagonal adjustment element such as a chain 99 is mounted between the rear pivot point 91 and the forward pivot point 95 on the bracket assembly. The chain may be locked either to the bracket members or through the openings 96 in the bracket members 94. As the length of the chain 99 is shortened, the hood will be drawn more rearwardly pivoting upwardly towards the support beam 42.

During use of the sprayer, it is preferred that the forward end of the hood 65 be slightly elevated with respect to the rear end and thus appropriate adjustment is made between the bracket members 92 and 93. In order to prevent damage and wear to the lower edge of the hood 65, replaceable wear plates 100 are mounted along the lowest outer edges thereof along sidewall 67 and 68. The wear plates are secured by bolts 101. The wear plates may be formed of stainless steel or other wear resistant material and may be provided with beveled ends along either or both the front and rear ends thereof in order to reduce the possibility of the hood becoming wedged or gouging into the ground as the implement is being moved through a field.

Figure 3:
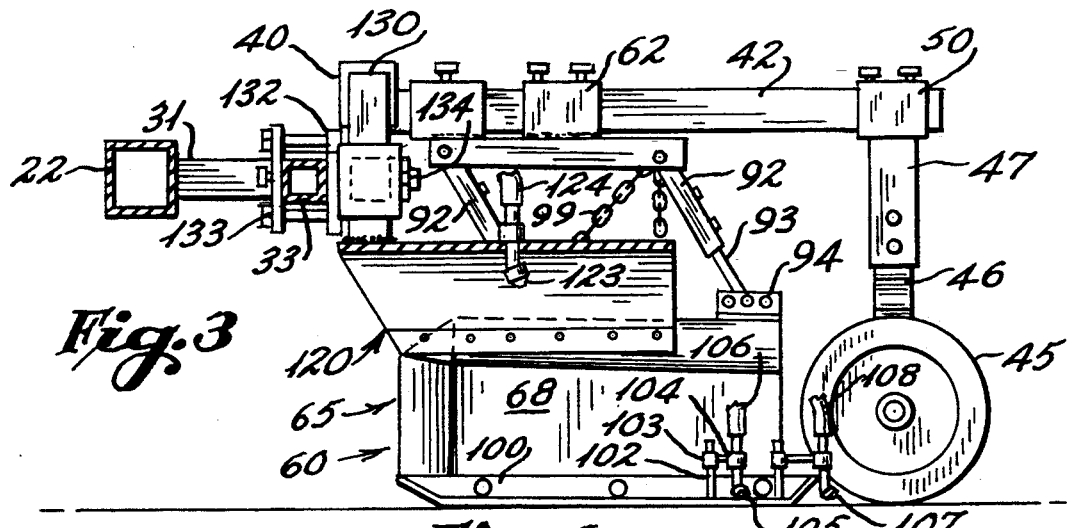
FIG. 3 is a cross sectional view taken along line 3—3 of FIG. 2 showing the nozzles associated with a secondary spray hood assembly and the supplemental nozzles associated with hoods of the primary spry hood assemblies.
Figure 4:
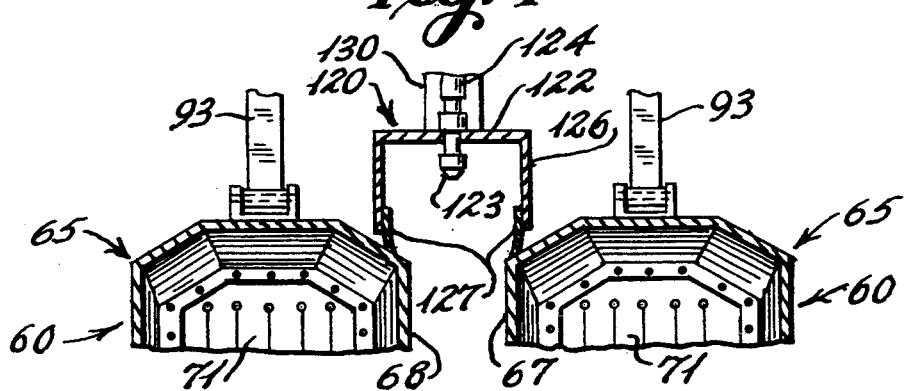
FIG. 4 is a cross sectional view taken along line 4—4 of FIG. 2 showing the relationship between a pair of spaced primary spray hood assemblies and an intermediate secondary spray hood assembly.

With particular reference to FIGS. 3 and 9, the sprayer also provides for the application of chemical agents in the area adjacent to the base of plants in a plant row. In order to do this, in a first embodiment, a pair of uprights 102 are welded or otherwised secured to the wear plates 101 adjacent the rear portion of the hood 65 along the outer walls 67 and 68 thereof. Although two uprights are shown in FIG. 3, a single or multiple uprights may be mounted to the wear plate 100. A vertically adjustable bracket 103 is secured to each upright 102 which carries a mounting sleeve 104 through which a first and second spray nozzles 105 and 107 are connected. The nozzle 105 is designed to be connected through fluid line 106 to one of the chemical tanks "C1-C4" which contains a fertilizer or growth stimulant for application to the area at the base of the plants in a crop row. By suitably adjusting the positioning of the nozzle 105 relative to the support 104 and the upright 102, the spray from the nozzle may be directed generally at the base of the plants in the adjacent crop row. In a like manner, the nozzle 107 is provided with chemical fluid inlet line 108 connected to one of the chemical tanks "C1-C4" which contains a herbicide or fungicide or other agent which is to be applied close to, but spaced from, the base of the plants. This nozzle may be also selectively adjustable to ensure proper spraying of an area substantially close to the base of the plants. The amount of spray from nozzles 105 and 107 may be regulated by the pump assembly (not shown) so that there is little chance of inducing any noticeable volume of chemical spray into the atmosphere.

As opposed to mounting the spray nozzles 105 and 107 directly to the wear plates 101 and to protect the nozzles from being damaged by being impacted by objects in a field, a separate mounting block 110 may be mounted by bolts 111 to the sidewalls 67 and 68 as is shown in FIG. 9. In this manner, when the wear plates 100 have to be replaced, there is no need to remove the spray nozzles thereby facilitating the replacement of the wear plates 100. The nozzles 105 and 107 in the embodiment shown in FIG. 9 are vertically adjustable and are secured utilizing locking collars 113 or 112, respectively, which are welded or otherwised secured to the upper surface 114 of the mounting block 100. Set screws 115 and 116 are utilized to lock the nozzle stems 117 and 118 into a vertically adjusted or rotatably altered position as indicated by the arrows in FIG. 9. As the mounting block surrounds the nozzles, the nozzles are shielded from objects which might be engaged as the sprayer passes through a field.

As a further embodiment of the present invention, in order to reduce the entrainment of chemical fertilizers and insecticides which are applied to the crop rows, the sprayer of the present invention may include a plurality of secondary spray hood assemblies 120. The secondary spray hood assemblies include inverted elongated hoods 121 formed of the same material as the hoods 65 of the primary spray hood assemblies 60. The hoods 121 include an upper wall 122 through which is mounted one or more spray nozzles 123 which are connected to a chemical source through a fluid inlet line 124. The hoods 121 further includes spaced sidewalls 125 and 126 which are designed to extend generally into slightly overlapping relationship with respect to the spaced sidewalls 67 and 68 of an adjacent hood 65 of the primary spray hood assemblies. In order to seal the lower edges of the sidewalls 125 and 126 with respect to the sidewalls 67 and 68 of the hoods 65, elongated flexible seals 127 are secured to the lower edges thereof. The hoods 121 are vertically adjustable by being mounted to vertical support struts 130 which are welded or otherwised securely fastened to the upper wall 122 of the hoods and which are mounted within support brackets 132 mounted to the auxiliary tool bar sections by mounting brackets 133, as is shown in FIG. 3. The struts 130 are locked into a vertically positioned engagement with the brackets 132 by locking bolts 134.

When the secondary spray hood assemblies are in use, they will be used to introduce either fungicides or insecticides to the foliage of the plants in the crop rows.

From the foregoing, it can be seen that the sprayer of the present invention offers utility in not only allowing multiple and varied chemicals to be applied to crop rows and to the areas between adjacent crop rows simultaneously, but also does so by providing maximum containment for toxic chemicals being sprayed. In addition to the foregoing, the pivotable implement support beams 42 which are supported along their length by the gauge wheel assemblies, allow a continuously tracking of the support beams 42 relative to the ground surface. This in combination with the suspension bracket assembly 61 and the proper pitch positioning of the hoods 65 allows the sprayer to traverse even rough terrain without causing damage to the spraying equipment and further permits the hoods to follow in close contact with the earth thereby preventing accidental chemical discharge of herbicides and other chemicals being sprayed within the hoods 65.

Further, in the event that spray nozzles need to be serviced or maintenance, with the present invention, the nozzles may be easily removed utilizing the mounting arrangement disclosed. It should further be noted, that this same removable clip type mounting arrangement could be provided for use with the hoods 120 associated with the secondary spray hood assemblies for use over the crop rows.

In the preferred embodiment, it is envisioned that each of the locking bolts such as 51 and 63 and 134 associated with the various components of the sprayer be of the same size so that a single tool may be utilized to adjust each of the elements of the sprayer.

I claim:

1. An agriculture sprayer for confining chemicals being applied in areas between crop rows while allowing the simultaneous application of chemicals to plants along the crop rows, the sprayer comprising:

a. a tool bar;
b. at least one support beam pivotally mounted to said tool bar, said support beam having a gauge wheel means mounted thereto;
c. a primary spray hood assembly, said primary spray hood assembly including an inverted u-shaped primary hood having opposing depending sidewalls and generally open front and rear ends, a first spray means for spraying a chemical between the crop rows, means for removably mounting said first spray means within said primary hood;
d. means for adjustably supporting said primary spray hood assembly to said support beam; and
e. a secondary spray hood assembly having a secondary inverted u-shaped hood mounted adjacent said primary hood, a secondary spray means mounted within said secondary hood, and means for vertically mounting said secondary hood relative to said tool bar.

2. The sprayer of claim 1 in which each of said sidewalls of said primary hood include lower edges, and wear plate means removably mounted adjacent each of said lower edges.

3. The sprayer of claim 2 including at least one auxiliary spray means having a vertical support mounted to at least one of said wear plate means, and said at least one auxiliary spray means is adjustably mounted to said vertical support.

4. The sprayer of claim 2 including a plurality of flap means mounted to said primary hood so as to substantially close said front end.

5. The sprayer of claim 4 including a plurality of flap means mounted to said primary housing so as to substantially close said rear end.

6. The sprayer of claim 1 in which said secondary hood includes opposing sidewalls having lower edges, and seal means being secured along said lower edges of said sidewalls.

7. The sprayer of claim 1 including a plurality of generally equally spaced support beams, a plurality of primary spray hood assemblies mounted to said support beams in spaced relationship to one another, and a plurality of secondary spray hood assemblies mounted between said primary spray hood assemblies.

8. The sprayer of claim 7 in which said secondary hoods include opposing sidewalls having lower edges, and seal means being secured along said lower edges of said sidewalls.

9. The sprayer of claim 7 including means mounted to each of said support beams for limiting the pivotable movement thereof relative to said tool bar.

10. The sprayer of claim 7 in which said means for removably mounting said first spray means within said primary hood includes a first support within said primary hood and a clip mounted to said primary hood adjacent an opening therein.

11. The sprayer of claim 7 including means for vertically adjustably mounting each of said gauge wheel means to said support beams.

12. The sprayer of claim 7 in which said means for adjustably supporting said primary spray hood assemblies includes a parallel linkage having a pair of vertically depending opposed slidably adjustable bracket members, and means for securing said bracket members in adjusted position.

13. The sprayer of claim 7 including means for preventing the pivotable movement of at least one of said support beams relative to said tool bar.

14. The agricultural sprayer of claim 7 including at least one auxiliary spray means mounted adjacent to at least one of said depending sidewalls of said primary hood for directing a chemical toward the plants along the crop row.

15. The sprayer of 14 including a plurality of said auxiliary spray means, and block means mounted to each of said sidewalls of said primary hoods for adjustably supporting said auxiliary spray means to opposite sides of said sidewalls of said primary hoods.

16. The sprayer of claim 1 including means mounted to each of said support beams for limiting the pivotable movement thereof relative to said tool bar.

17. The sprayer of claim 1 in which said means for removably mounting said first spray means within said primary hood includes a first support within said primary hood and a clip mounted to said primary hood adjacent an opening therein.

18. The agricultural sprayer of claim 1 including at least one auxiliary spray means mounted adjacent to at least one of said depending sidewalls of said primary hood for directing a chemical toward the plants along the crop row.

19. An agriculture sprayer for confining chemicals being applied in areas between crop rows while allowing the simultaneous application of chemicals to plants along the crop rows, the sprayer comprising:
a. a tool bar;
b. a plurality of support beams pivotally mounted to said tool bar, said support beams having gauge wheel means mounted thereto;
c. a plurality of primary spray hood assemblies, each of said primary spray hood assemblies including an inverted u-shaped primary hood having opposing depending sidewalls and open front and rear ends, a first spray means for spraying a chemical between the crop rows, means for removably mounting said first spray means within said primary hood, flap means for covering said open front and rear ends;
d. a plurality of suspension means for adjustably supporting said primary spray hood assemblies to said support beams; and
e. a plurality of secondary spray hood assemblies having a secondary inverted u-shaped hood mounted adjacent said primary hoods, and each of said secondary spray hood assemblies having a secondary spray means mounted within said secondary hood and means for vertically mounting said secondary hood relative to said tool bar.

20. The sprayer of claim 19 including an auxiliary spray means mounted adjacent to said depending sidewalls of a plurality of said primary hoods for directing a chemical toward the plants along the crop row.

* * * * *